United States Patent
Karlsson et al.

(10) Patent No.: US 10,620,720 B2
(45) Date of Patent: Apr. 14, 2020

(54) INPUT CONTROLLER STABILIZATION TECHNIQUES FOR VIRTUAL REALITY SYSTEMS

(71) Applicant: GOOGLE LLC, Mountain View, CA (US)

(72) Inventors: Per Karlsson, Mountain View, CA (US); Matthew Seegmiller, Mountain View, CA (US); Adam Glazier, Oakland, CA (US); Evan Hardesty Parker, Los Altos, CA (US); Matthias Buhlmann, Wollerau (CH); Dominik Philemon Kaeser, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 15/813,999

(22) Filed: Nov. 15, 2017

(65) Prior Publication Data
US 2018/0136744 A1   May 17, 2018

Related U.S. Application Data

(60) Provisional application No. 62/422,464, filed on Nov. 15, 2016.

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/011* (2013.01); *G06F 3/0338* (2013.01); *G06T 19/003* (2013.01)

(58) Field of Classification Search
CPC ... G06F 3/00; G06F 3/01; G06F 3/033; G06F 3/011; G06F 3/012; G06F 3/013; G06F 3/0346
See application file for complete search history.

(56) References Cited

U.S. PATENT DOCUMENTS

2008/0030429 A1   2/2008   Hailpern et al.
2008/0211771 A1*  9/2008   Richardson ............ A63F 13/10
                                                      345/158
(Continued)

FOREIGN PATENT DOCUMENTS

WO   2018005061 A1   1/2018

OTHER PUBLICATIONS

Written Opinion of the International Preliminary Examining Authority for International Application No. PCT/US2017/061798, dated Oct. 10, 2018, 7 pages.
(Continued)

*Primary Examiner* — Priyank J Shah
(74) *Attorney, Agent, or Firm* — Brake Hughes Bellerman LLP

(57) ABSTRACT

A technique may include determining a cumulative movement of an input controller in a physical environment, determining a scaling factor based on the cumulative movement of the input controller in the physical environment, determining a current movement of the input controller in the physical environment for a time period, and registering, in a virtual environment, only a portion of the current movement of the input controller based on the scaling factor.

20 Claims, 13 Drawing Sheets

(51) Int. Cl.
*G06F 3/0338* (2013.01)
*G06T 19/00* (2011.01)

(56) References Cited

U.S. PATENT DOCUMENTS

| | | | |
|---|---|---|---|
| 2009/0115724 A1* | 5/2009 | Yamamoto | G06F 3/0346 345/158 |
| 2009/0295721 A1* | 12/2009 | Yamamoto | G06F 3/0346 345/158 |
| 2010/0113153 A1* | 5/2010 | Yen | A63F 13/06 463/37 |
| 2010/0315339 A1* | 12/2010 | Yamamoto | G06F 3/0346 345/159 |
| 2013/0328762 A1 | 12/2013 | McCulloch et al. | |
| 2014/0361977 A1 | 12/2014 | Stafford et al. | |
| 2016/0098095 A1* | 4/2016 | Gonzalez-Banos | G06F 3/017 345/156 |
| 2017/0061702 A1* | 3/2017 | Christen | G06T 19/20 |
| 2017/0160815 A1* | 6/2017 | Glazier | G06F 3/04815 |
| 2017/0228922 A1* | 8/2017 | Kaeser | G06F 3/04815 |
| 2018/0005438 A1* | 1/2018 | Mathey-Owens | G02B 27/0172 |

OTHER PUBLICATIONS

International Search Report and Written Opinion for International Application PCT/US2017/061798, dated Jan. 31, 2018, 13 pages.

* cited by examiner

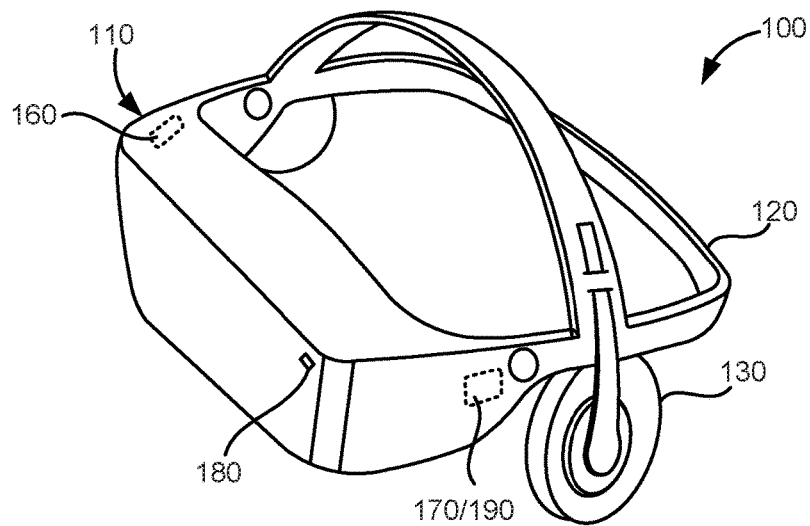
FIG. 3A
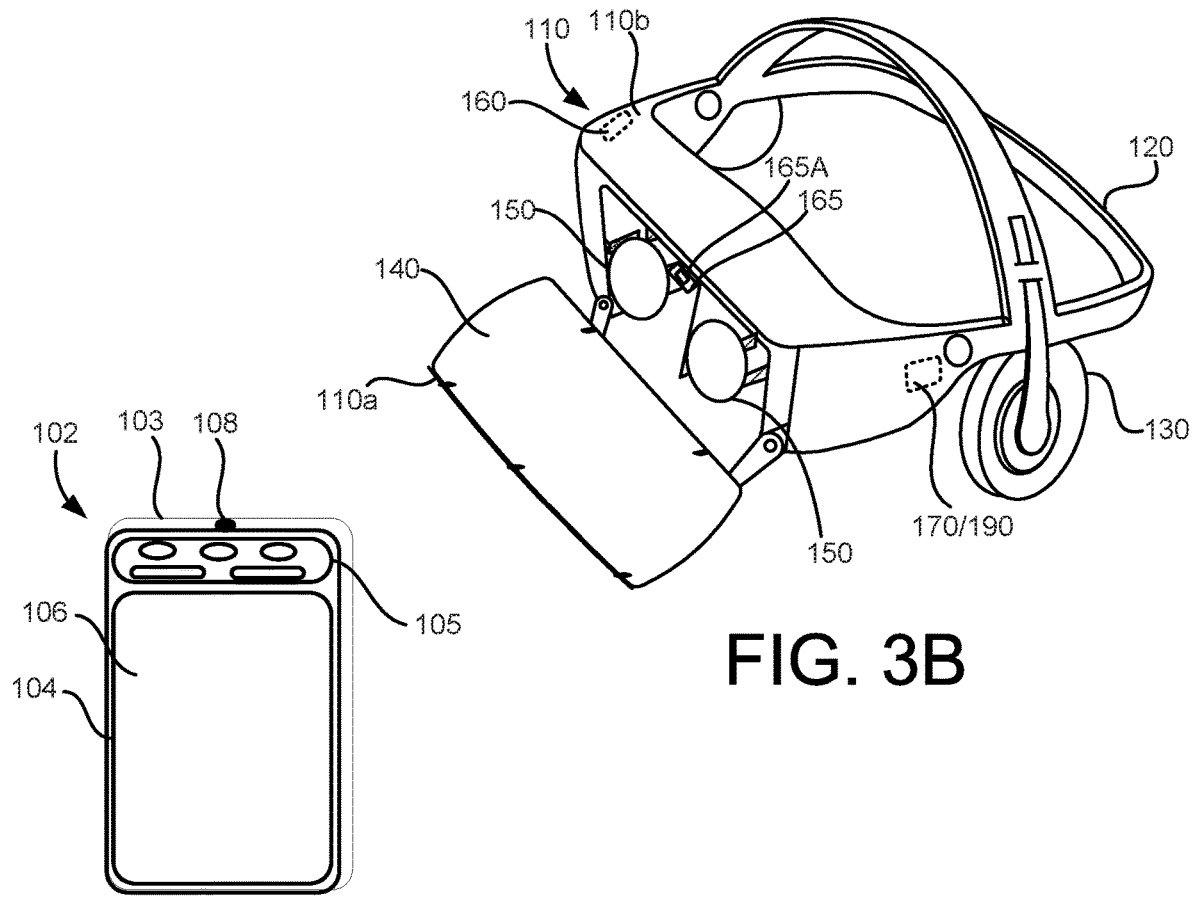
FIG. 3B
FIG. 3C

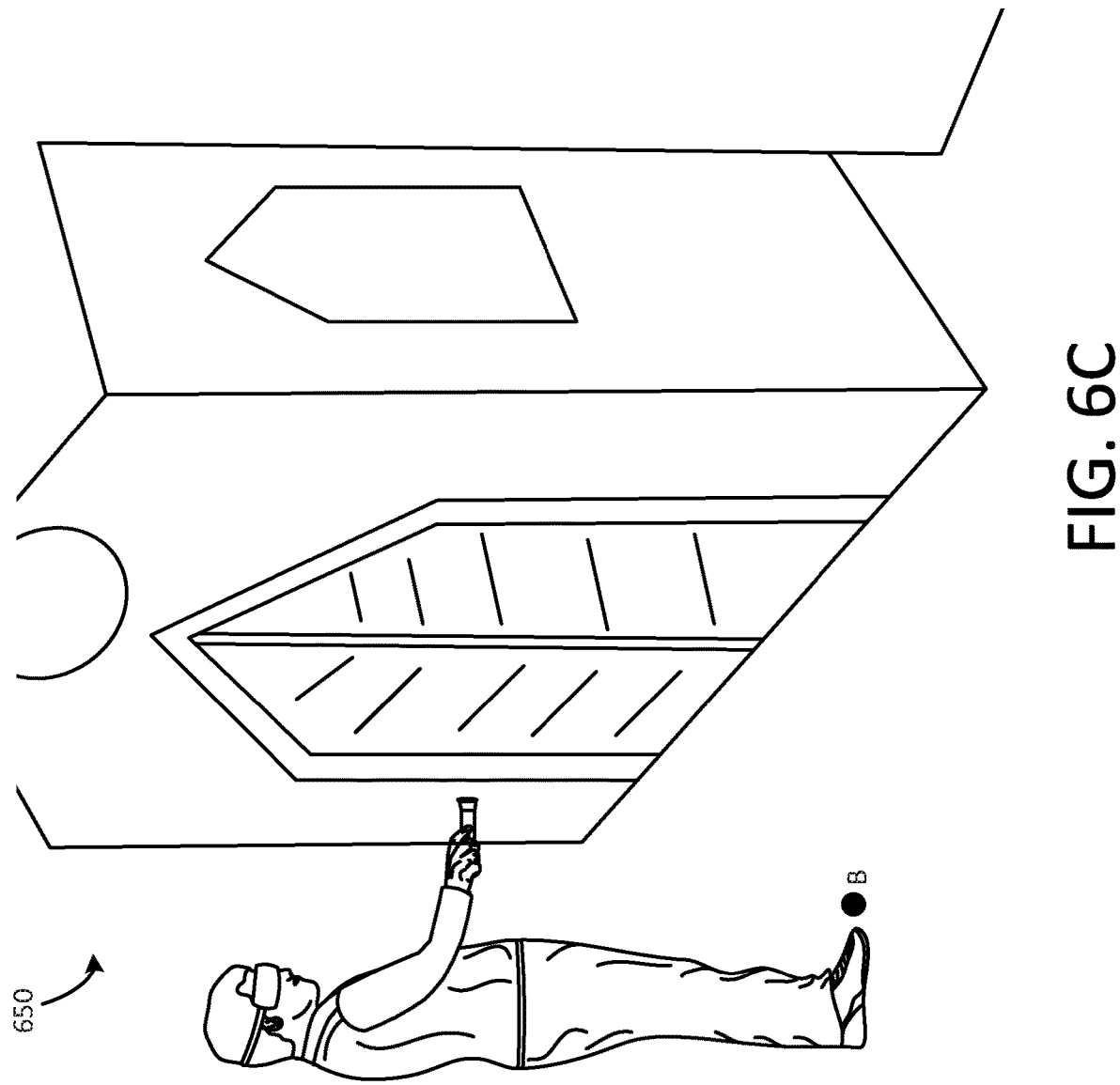

INPUT CONTROLLER STABILIZATION TECHNIQUES FOR VIRTUAL REALITY SYSTEMS

CROSS-REFERENCE TO RELATED APPLICATIONS

This application claims priority to, and is a continuation of, U.S. Patent Application No. 62/422,464, filed on Nov. 15, 2016, entitled "INPUT CONTROLLER STABILIZATION TECHNIQUES FOR VIRTUAL REALITY SYSTEMS", the disclosure of which is incorporated by reference herein in its entirety.

FIELD

This relates, generally, to input controller stabilization techniques in an augmented and/or virtual reality environment.

BACKGROUND

An augmented reality (AR) and/or a virtual reality (VR) system may generate a three-dimensional (3D) immersive virtual environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the 3D virtual environment, the user may move through the virtual environment, through physical movement and/or manipulation of an electronic device to interact with the virtual environment and personalize interaction with the virtual environment.

SUMMARY

In one aspect, a method may include receiving, by processing circuitry of a computing system, first movement data indicating a first six-degree-of-freedom (6DOF) movement of an input controller held by a user within a physical environment occupied by the user. The method may also include producing, by the processing circuitry, a scaling factor based on the first 6DOF movement of the input controller within the physical environment. The method may further include receiving, by the processing circuitry after receiving the first movement data, second movement data indicating a second 6DOF movement of the input controller within the physical environment over a time period. The method may further include, in response to receiving the second movement data, performing, by the processing circuitry, an object movement operation to produce a scaled movement of an object within a virtual environment, the object movement operation including multiplying a movement of the object within the virtual environment corresponding to the second 6DOF movement by the scaling factor to produce the scaled movement of the object within the virtual environment.

The details of one or more implementations are set forth in the accompanying drawings and the description below. Other features will be apparent from the description and drawings, and from the claims.

BRIEF DESCRIPTION OF THE DRAWINGS

FIGS. 3A and 3B are perspective views of an example head mounted display device, and FIG. 3C illustrates an example handheld electronic device, in accordance with implementations described herein.

FIGS. 6A-6D are third person views illustrating movement and scaling of a user and/or virtual features in an augmented and/or virtual reality environment, in accordance with implementations described herein.

DETAILED DESCRIPTION

A user immersed in an augmented and/or virtual reality environment wearing, for example, a head mounted display (HMD) device may explore the virtual environment (e.g., three dimensional (3D) virtual environment) and interact with the virtual environment through various different types of inputs. Reference to a virtual environment can include a physical environment augmented by virtual elements. These inputs may include, for example, physical interaction including, for example, manipulation of an electronic device, such as an input controller, separate from the HMD such as, for example, via a ray or beam emitted by the electronic device and/or a virtual beam rendered in the virtual environment based on the manipulation of the electronic device, a movement of the electronic device, a touch applied on a touch sensitive surface of the electronic device and the like, and/or manipulation of the HMD itself, and/or hand/arm gestures, head movement and/or head and/or eye directional gaze and the like. A user may implement one or more of these different types of interactions to execute a particular action in the virtual environment, such as, for example, moving through the virtual environment, and moving, or transitioning, or teleporting, from a first area of the virtual environment to a second area of the virtual environment, or from a first virtual environment to a second virtual environment.

Techniques of controlling movement of objects in a virtual environment disclosed herein involve defining a movement of an object in a virtual environment based on a scaling factor produced based on a previous movement of an input controller held by a user. Along these lines, a user moves an input controller along a six-degree-of-freedom (6DOF) movement path to produce first movement data. Based on the 6DOF movement path, a computing system produces a scaling factor that indicates an amount of jitter reduction used in subsequent motion. Accordingly, in response to receiving second movement data indicating a new 6DOF movement path, the computing system performs an object movement operation to produce a scaled movement of the object in the virtual environment.

Figure 1A:
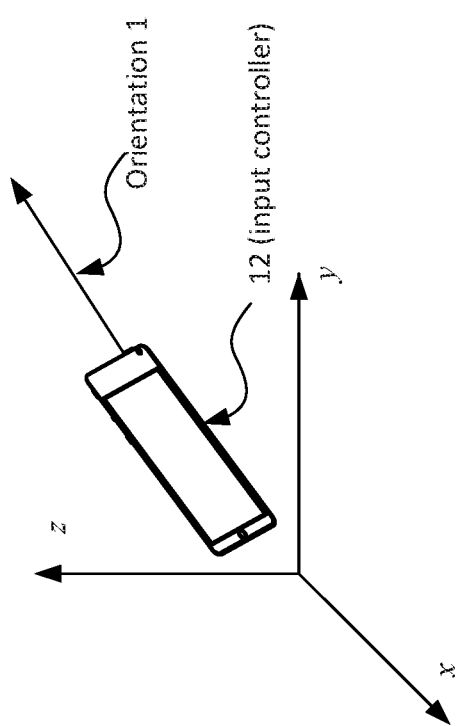
FIG. 1A is a diagram illustrating a first 6DOF position of an input controller according to an example implementation.
Figure 1B:
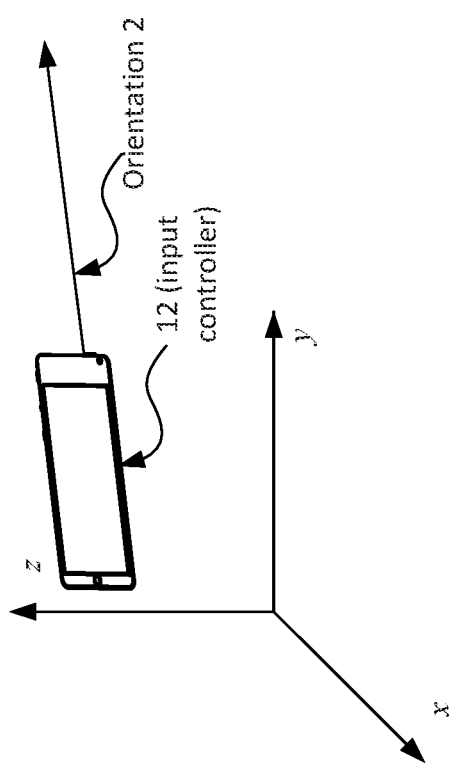
FIG. 1B is a diagram illustrating a second 6DOF position of an input controller according to the example implementation.

FIGS. 1A and 1B are diagrams illustrating a six-degree-of-freedom (6DOF) position of a handheld input controller according to an example implementation. A user may use handheld input controller 12 to perform various gestures or movements to interact with a virtual environment that may be presented to the user via a HMD, for example. While using or operating input controller 12, the input controller 12 may change states over time, where a state of the input controller 12 may include at least one of (or both of): a position (or location) of the input controller 12, which may be identified by 3-dimensional positional coordinates (x, y and z coordinates), and an orientation of the input controller 12, which may be an angular position (pitch, yaw, roll) or direction of orientation of the input controller (e.g., which direction is the input controller 12 pointing). For example, orientation of the input controller 12 may be identified as a point on a unit sphere toward which the input controller 12 is pointed. For example, at time t1, input controller 12 may be at state 1, which may include a position of (x1, y1, z1) and an orientation of orientation 1. At time t2, the input controller 12 has moved, and is now at state 2 including position 2 of (x2, y2, z2) and an orientation of orientation 2.

In some cases, a relatively small movement (e.g., a small change in state) of the input controller 12 in the physical environment 10 may result in large, and in some cases unintended, movement or changes in the virtual environment. For example, the user may select or actuate a button or trigger on input controller 12 to spawn or generate a ray from input controller 12, where the ray may be pointed towards a building or other object to be moved in the virtual environment. However, a small, (e.g., unintentional) movement of the input controller (e.g., a hand that is shaking or is slightly unstable) may result in a large movement of the end of the ray or the building or object that may be far away from the controller 12 in the virtual environment. These relatively small movements of the input controller in the physical environment may be similar to jitter or may be unintended movements or shaking. It may be desirable to stabilize the input controller, e.g., by filtering or dampening (e.g., reducing) at least some movements of the input controller 12 in the physical environment that will be registered in the virtual environment.

According to an example implementation, a scaling factor (or weighting factor) may be determined. And, for example, only a portion of a movement (or a change in state) of the input controller 12 in the physical environment may be registered in the virtual environment based on the scaling factor. Registering (e.g., within a virtual reality system or HMD) movement of the input controller in the virtual environment may include, for example, displaying movement of the input controller 12 in the virtual environment or displaying changes in the virtual environment based on the movement of the input controller 12 in the physical environment, or processing changes in the virtual environment based on movement of the input controller 12 in the physical environment. In this manner, by registering in the virtual environment only a portion (e.g., based on the scaling factor) of the movement of the input controller 12 in the physical environment, the movement of the input controller 12 (or results of the input controller 12 movement in the physical environment) may be stabilized and/or the jitter or input controller instability may be reduced, e.g., at least for some movements of the input controller 12 in the physical environment.

According to an example implementation, at least one filter may be provided that may be used to dampen or reduce movement of the input controller 12 in the physical environment that is registered in the virtual environment. According to an example implementation, the filter may include a scaling factor (which may also be referred to as a weighting factor), e.g., between 0 and 1. According to an example implementation, the scaling factor may be selected or determined based on a cumulative amount of movement (e.g., cumulative change in state) of the input controller 12 in the physical environment since an initial state of the input controller. For example, an initial state (e.g., including an initial position and/or an initial orientation) of the input controller 12 may be determined when a gesture is started by the user using the input controller 12. When a new gesture is started, another initial state is determined. A gesture may be started, for example, when an input, button, or trigger on the input controller 12 is selected or actuated, or when a rapid or specific movement with the input controller is begun, as illustrative examples.

The dampening or stabilization technique(s) described herein may be active during an active gesture, and may begin after an initial state of the input controller 12 has been determined at the start of the gesture, for example. Thus, the dampening or stabilization technique(s) described herein may be active (or in operation), for example, after a user has pressed a trigger or actuated/depressed a button to select an object for dragging or movement, for example. Thus, the dampening or stabilization techniques described herein may be active once a user has pressed a trigger (or made some other selection) to put the input controller in dragging mode (for example) or in other mode for manipulating or controlling an object in the virtual environment. When using the input controller 12 to move or manipulate an object in the virtual environment, this also may provide the added advantage of simulating weight of the object being manipulated or dragged, based on the delay (or lag) in time in registering movement in the virtual environment based on physical movement of the input controller in the physical environment (e.g., based on use of a filter or a scaling factor).

A cumulative movement (or cumulative amount of movement) of the input controller 12 in the physical environment may be determined, for example, as an amount of movement that has occurred by the input controller 12 in the physical environment since an initial state of the input controller 12. Thus, for example, cumulative movement may include a cumulative change in state of the input controller 12 since an initial state (e.g., since the gesture started). A cumulative movement (or cumulative amount of movement) may be determined, for example, as a cumulative change in state of the input controller in the physical environment based on an initial state of the input controller 12 in the physical environment and a current state of the input controller 12 in the physical environment. For example, in a simple example, a cumulative change in state may be determined by subtracting the current state of the input controller from the initial state of the input controller.

In another illustrative example, a change in orientation may be determined as the linear change in angle or phase between the two orientations (first orientation and second orientation) of the input controller 12 in the physical environment. Similarly, a change in position (from a first position until a second position) of the input controller 12 in the physical environment may be determined, e.g., as the linear distance between the two positions of the input controller 12 (e.g., position 2, position 1). Thus, for example, if the first position is position 1 (x1, y1, z1), and the second position of the input controller 12 in the physical environment is position 2 (x2, y2, z2), then the linear distance (the change in position) of the input controller 12 may be determined as square root of the sum of the squares:

$$\text{Distance} = \text{sqrt}((x2-x1)^2 + (y2-y1)^2 + (z2-z1)^2).$$

According to an example implementation, in order to reduce jitter or assist in stabilizing the input controller, different scaling factors may be used, depending on the (amount of) 6DOF movement of the input controller 12 in the physical environment since an initial state. For example, a lower (or smaller) scaling factor may be used when the 6DOF movement is small or less than a threshold, while a higher (or larger) scaling factor may be used when 6DOF movement of the input controller 12 in the physical environment is greater than the threshold. For example, a scaling factor of 0.2 may be used if 6DOF movement is less than a first threshold (e.g., less than 3 inches), and a scaling factor of 0.6 may be used if 6DOF movement is greater than the first threshold. Additional thresholds and additional scaling factors may be used. These are merely some illustrative example scaling factors, and others may be used. These are some examples of static filters or static scaling factors where the scaling factor is fixed or static. However, a dynamic filter or a dynamic scaling factor may be used as well, e.g., where the scaling factor linearly or non-linearly changes, e.g., increases, as the 6DOF movement changes.

Figure 1C:
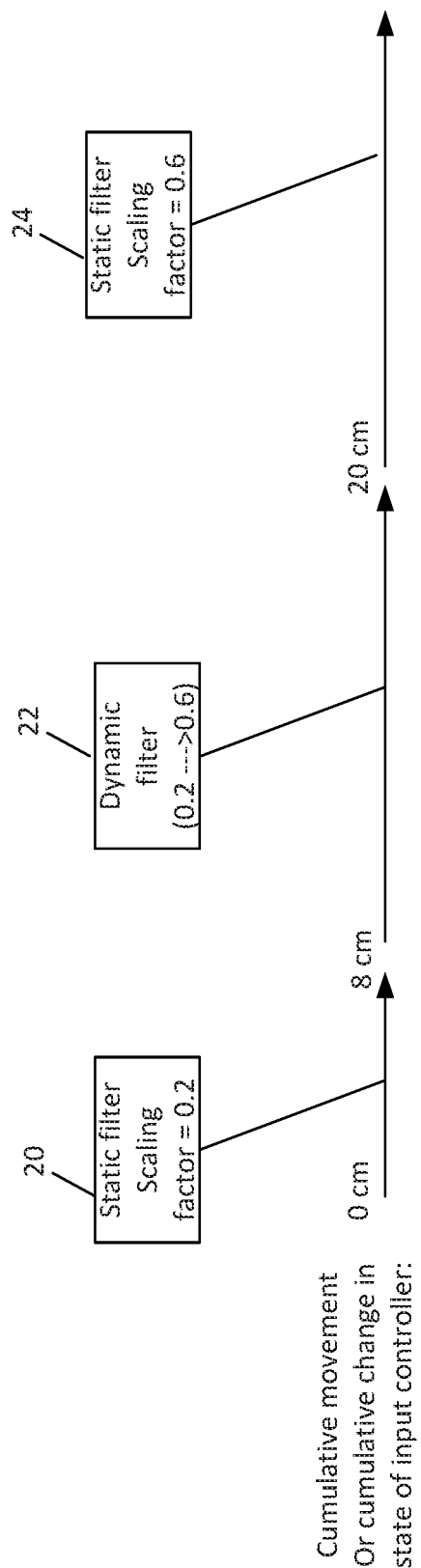
FIG. 1C is a diagram illustrating example 6DOF movement and scaling factors according to an example implementation.

FIG. 1C is a diagram illustrating example filters and scaling factors according to an example implementation. The example shown in FIG. 1C shows the use of three filters, Thus, for example, as shown in illustrative example of FIG. 1C, a static filter 20, with a fixed/static scaling factor of N (e.g., 0.2) is used for cumulative movement or cumulative change of state of the input controller 12 in the physical environment that is less than distance A (e.g., 8 centimeters). A dynamic filter 22 is used, with a linearly varying scaling factor that varies between N and M (e.g., 0.2 and 0.6) for a 6DOF movement of the input controller between distance B and C (e.g., 8 centimeters and 20 centimeters). And, a static filter 24, with a static/fixed scaling factor of F (e.g., 0.6), is used for 6DOF movement of the input controller in the physical environment that is greater than C (e.g., 20 centimeters).

In this manner, for small movements (such as jitter or unintentional shaking of the input controller 12 in the physical environment, the movement or change in state of the input controller 12 will typically be small, e.g., less than the first threshold (e.g., 3 inches), where only 20% (based on scaling factor=0.2) of a first 6DOF movement of the input controller in the physical environment will be registered in the virtual environment. As the 6DOF movement (e.g., change in position or orientation of input controller 12 since an initial state) increases (e.g., is now greater than 8 cm or greater than 20 cm), then the scaling factor used for controller dampening will increase (either through the dynamic filter 22 or the static filter 24), thereby registering a greater amount of the 6DOF movement of the input controller 12. As noted, the 6DOF movement may be the change in 6DOF position of the input controller 12 in the physical environment over a current or recent time period (e.g., the change in position or change in orientation of input controller 12 in physical environment since the last frame has been displayed on display of HMD).

A current change in the 6DOF position of the input controller 12 may be determined, for example, by determining a current change in 6DOF position (e.g., current change in position or orientation) of the input controller 12 in the physical environment based on the current 6DOF position (e.g., current position or current orientation) of the input controller in the physical environment and (or with respect to) a previous 6DOF position (during a previous time period, previous sampling period, or previous frame) of the input controller in the physical environment. For example, a current change in 6DOF position may be determined by subtracting two corresponding position values (in the x, y or z axis) of the current and previous 6DOF positions. The change in 6DOF position of input controller 12 may be determined as a change in 6DOF position of input controller 12 since an initial 6DOF position (e.g., which may be beginning of a gesture using the input controller), where the initial 6DOF position may be before the previous 6DOF position. Near the beginning of the gesture, the previous 6DOF position and the initial 6DOF position may be the same 6DOF position. Thus, a 6DOF movement may be determined, for example, by determining a change in 6DOF position of the input controller 12 in the physical environment based on the initial 6DOF position of the input controller and the current 6DOF position of the input controller, and a current movement or current change in state may be determined, for example, based on a previous 6DOF position of the input controller and the current 6DOF position of the input controller.

According to an example implementation, the scaling factor may determine how much of the current movement (e.g., movement of input controller 12 in physical environment over a recent or current time period) or current change in 6DOF position (e.g., change in position or change in orientation of the input controller 12, such as a change in state of input controller 12 since display of the last frame on the HMD) will be registered in the virtual environment. In one example, the scaling factor may be multiplied by the current change in 6DOF position or current movement in the physical environment to determine the amount of change in 6DOF position or an amount of movement of the input controller 12 that will be registered in the virtual environment. For example, if the input controller 12 has moved to the right from x=0 to x=3 cm during a current or recent time period (e.g., since the last frame), and a scaling factor has been selected that is 0.2, then this means that the input controller movement=(scaling factor) (current change in position)=(0.2) (3 cm)=0.6 cm of movement in the virtual environment. This means that, 0.6 cm of the input controller movement in the x axis will be registered in the virtual environment.

In an example implementation, the amount of change in 6DOF position (e.g., change in position or change in orientation) to be registered in the virtual environment may be determined by performing a weighted (based on the scaling factor) linear interpolation between the current 6DOF position and the previous 6DOF position of the input controller 12, where a smaller scaling factor means that the interpolation is more heavily weighted in favor of the previous state (thereby registering in the virtual environment less of the current movement or less of current change in 6DOF position since the previous state), where a larger scaling factor means that the interpolation is more heavily weighted in favor of the current 6DOF position (thereby registering in the virtual environment more of the current movement or current change in state). Thus, for example, a larger scaling factor may be used for small cumulative movement/changes of 6DOF position to thereby dampen or reduce any current movements registered in the virtual environment. Also, as cumulative movement or cumulative change in 6DOF position of input controller 12 in physical environment increases, a larger scaling factor may, for example, be used or selected to reduce the dampening, thereby allowing more of the current movement or current change in state 6DOF position input controller in physical environment to be registered in the virtual environment. The process of determining a cumulative change in 6DOF position of the input controller 12, determining a current change in 6DOF position of the input controller, determining a scaling factor, and registering a portion of current movement or current change in 6DOF position based on the scaling factor may be repeated each frame (or may be repeated for each frame that is displayed to the user via the HMD).

Figure 2:
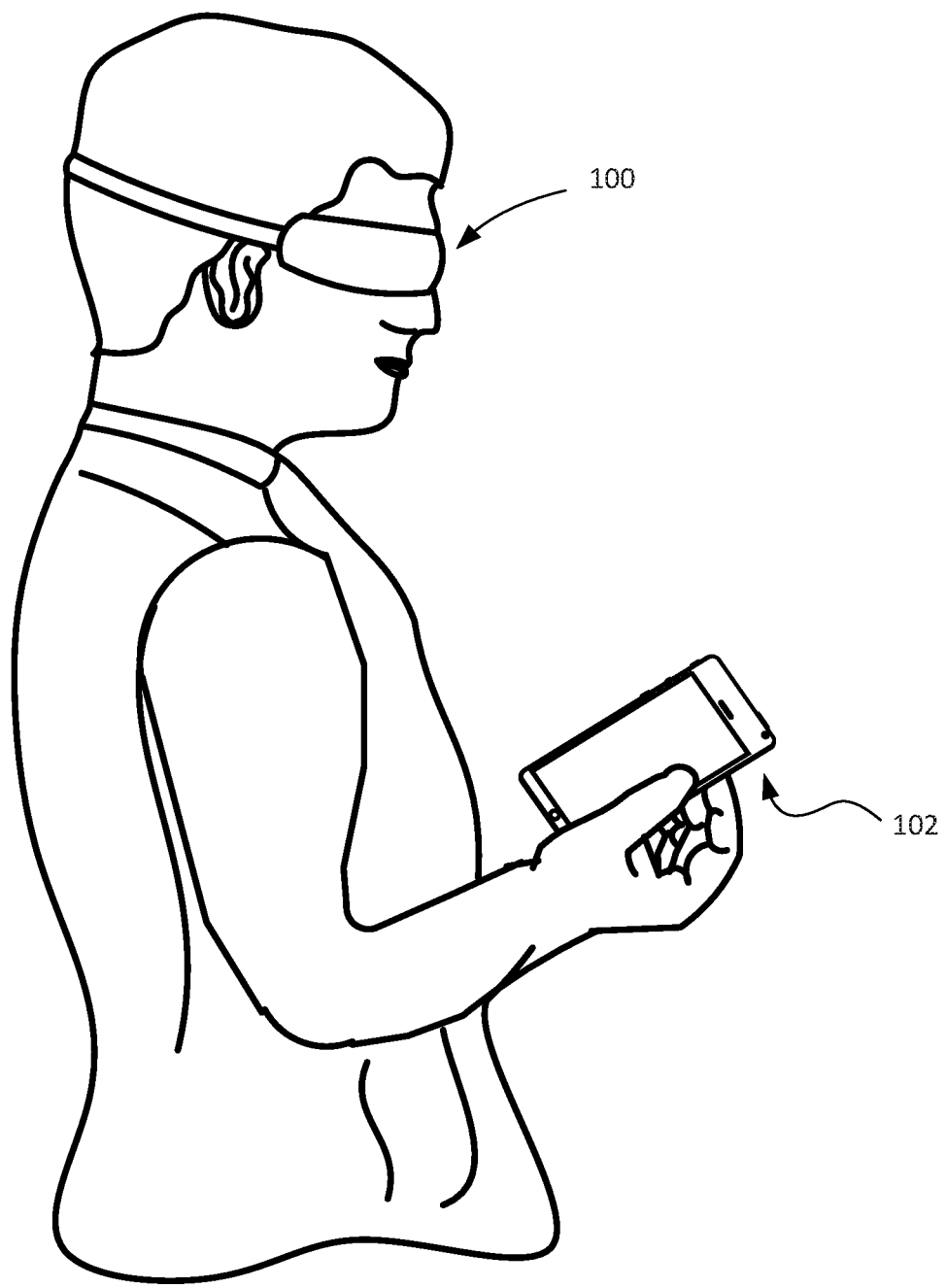
FIG. 2 is an example implementation of a virtual reality system including a head mounted display and a handheld electronic device, in accordance with implementations described herein.

In the example implementation shown in FIG. 2, a user wearing an HMD 100 is holding a portable handheld electronic device 102. The handheld electronic device 102, which may also be referred to as an input controller, may be, for example, a smartphone, a controller, a gyromouse, a joystick, or another portable handheld electronic device(s) that may be paired with, and communicate with, the HMD 100 for interaction in the immersive virtual environment generated by the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication and exchange of data between the handheld electronic device 102 and the HMD 100, and may allow the handheld electronic device 102 to function as a controller for interacting in the immersive virtual environment generated by the HMD 100. That is, a manipulation of the handheld electronic device 102, such as, for example, to generate a virtual beam or ray emitted by the handheld electronic device 102 directed to a virtual object or feature for selection, and/or an input received on a touch surface of the handheld electronic device 102, and/or a movement of the handheld electronic device 102, may be translated into a corresponding selection, or movement, or other type of interaction, in the immersive virtual environment generated by the HMD 100. For example, the HMD 100, together with the handheld electronic device 102, may generate a virtual environment as described above, and the handheld electronic device 102 may be manipulated to effect a change in scale, or perspective, of the user relative to the virtual features in the virtual environment as described above.

FIGS. 3A and 3B are perspective views of an example HMD, such as, for example, the HMD 100 worn by the user in FIG. 1, and FIG. 3C illustrates an example handheld electronic device, such as, for example, the handheld electronic device 102 shown in FIG. 1.

The handheld electronic device 102 may include a housing 103 in which internal components of the device 102 are received, and a user interface 104 on an outside of the housing 103, accessible to the user. The user interface 104 may include a touch sensitive surface 106 configured to receive user touch inputs. The user interface 104 may also include other components for manipulation by the user such as, for example, actuation buttons, knobs, joysticks and the like. In some implementations, at least a portion of the user interface 104 may be configured as a touchscreen, with that portion of the user interface 104 being configured to display user interface items to the user, and also to receive touch inputs from the user on the touch sensitive surface 106. The handheld electronic device 102 may also include a light source 108 configured to selectively emit light, through a port in the housing 103, and other manipulation devices 105 manipulatable by the user.

The HMD 100 may include a housing 110 coupled to a frame 120, with an audio output device 130 including, for example, speakers mounted in headphones, also be coupled to the frame 120. In FIG. 3B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the handheld electronic device 102 in the real environment, and/or may be displayed to the user on the display 140 in a pass through mode, allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

Figure 4A:
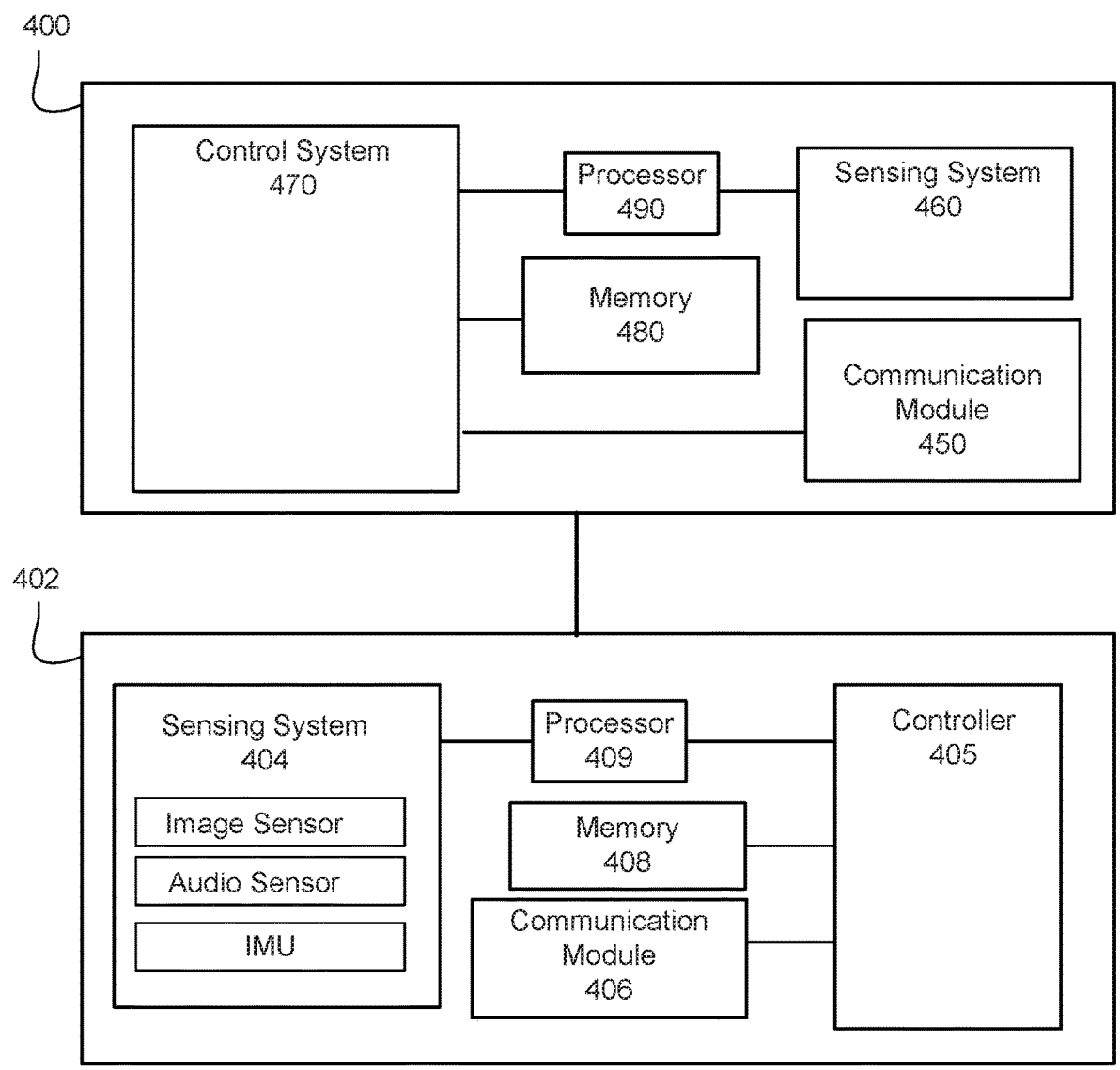
FIGS. 4A and 4B are block diagrams of a head mounted electronic device and a handheld electronic device, in accordance with embodiments as described here

A block diagram of a system providing for teleportation and scaling in an augmented and/or virtual reality environment is shown in FIG. 4A. The system may include a first electronic device 400 in communication with a second electronic device 402. The first electronic device 400 may be, for example an HMD as described above with respect to FIGS. 2, 3A and 3B, generating an immersive virtual environment, and the second electronic device 402 may be, for example, a handheld electronic device as described above with respect to FIGS. 2 and 3C, that is in communication with the first electronic device 400 to facilitate user interaction with the immersive virtual environment generated by the first electronic device 400.

The first electronic device 400 may include a sensing system 460 and a control system 470, which may be similar to the sensing system 160 and the control system 170, respectively, shown in FIGS. 3A and 3B. The sensing system 460 may include one or more different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 3B. The control system 470 may include, for example, a power/pause control device, audio and video control devices, an optical control device, a transition control device, and/or other such devices and/or different combination(s) of devices. The sensing system 460 and/or the control system 470 may include more, or fewer, devices, depending on a particular implementation. The elements included in the sensing system 460 and/or the control system 470 may have a different physical arrangement (e.g., different physical location) within, for example, an HMD other than the HMD 100 shown in FIGS. 3A and 3B. The first electronic device 400 may also include a processor 490 in communication with the sensing system 460 and the control system 470, a memory 480, and a communication module 450 providing for communication between the first electronic device 400 and another, external device, such as, for example, the second electronic device 402.

The processor 490 includes one or more processing chips and/or assemblies. The memory 480 includes both volatile memory (e.g., RAM) and non-volatile memory, such as one or more ROMs, disk drives, solid state drives, and the like. The processor 490 and the memory 480 together form control circuitry, which is configured and arranged to carry out various methods and functions as described herein. In some implementations, one or more of the components of the first electronic device 400 can be, or can include processors (e.g., processor 490) configured to process instructions stored in the memory 480.

Figure 4B:
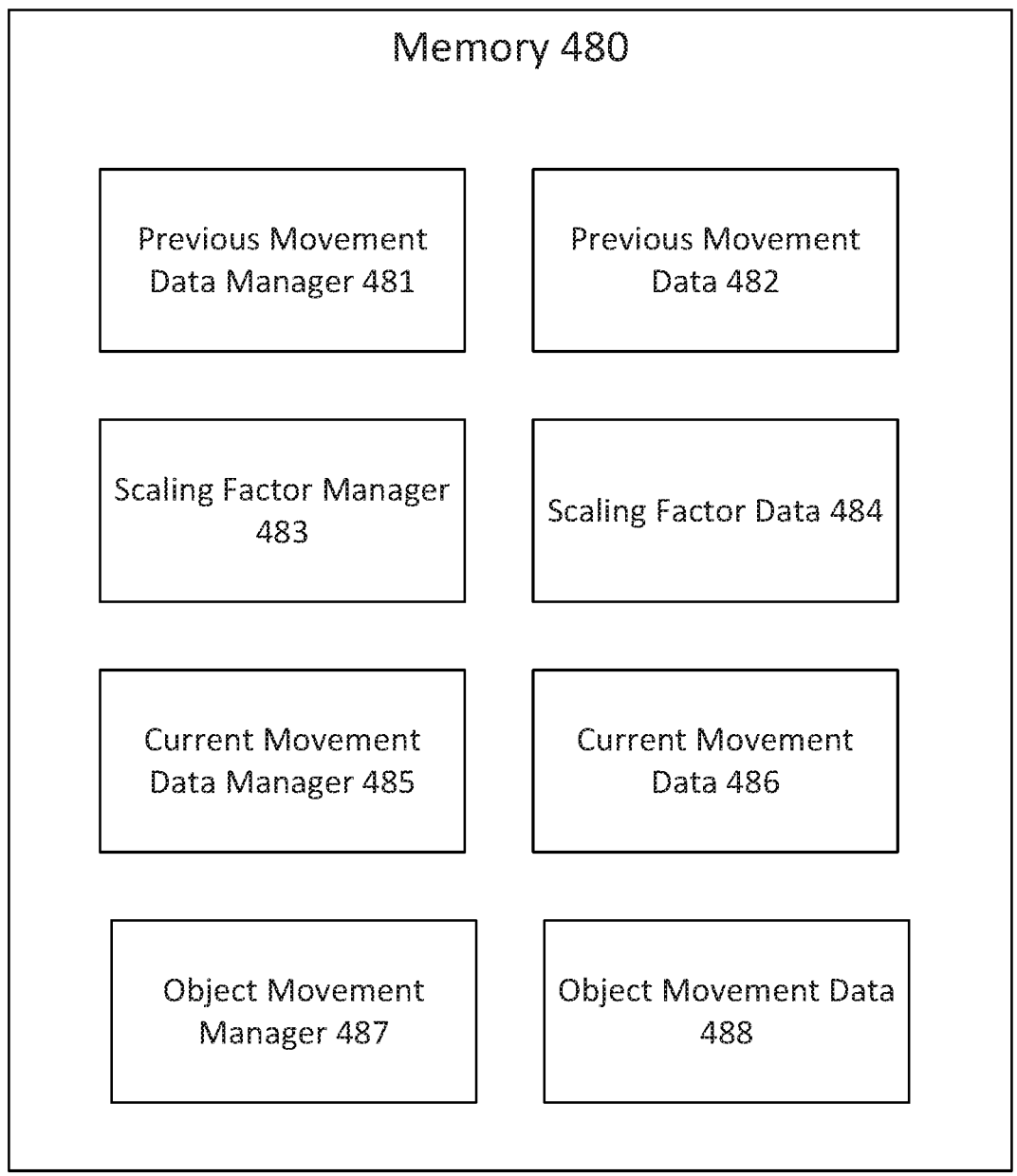

FIG. 4B is a diagram illustrating a more detailed view of the memory 480 of the first electronic device 400, FIG. 4B illustrates example instructions stored in the memory 480, including a cumulative movement data manager 481, a scaling factor manager 483, a current movement data manager 485, and an object movement manager 487. Further, as illustrated in FIG. 1, the memory 480 is configured to store various data, which is described with respect to the respective managers that use such data.

The previous movement data manager 481 is configured to receive cumulative movement data 482 indicating a first 6DOF movement of an input controller held by a user within a physical environment occupied by a user. For example, the previous movement data 482 may represent an initial 6 DOF position and a final 6 DOF position over a given time interval. In some implementations, the previous movement data 482 may represent a Euclidean length.

The scaling factor manager 483 is configured to generate scaling factor data 484, including a scaling factor, based on the previous movement data 482. For example, the scaling factor manager 483, in some implementations, is configured to produce a scaling factor as shown in FIG. 1B. In some implementations, the scaling factor manager 483 is configured to produce a scaling factor based on a single threshold value rather than two threshold values as shown in FIG. 1B. In some implementations, the scaling factor manager 483 is configured to produce a scaling factor based on angular displacement in addition to or instead of spatial displacement.

The current movement data manager 485 is configured to receive current movement data 486 indicating a second 6DOF movement of an input controller held by a user within a physical environment occupied by a user. For example, the current movement data 486 may represent a 6 DOF position at the start of a gesture and final 6 DOF position at the end of a gesture. In some implementations, the current movement data 486 may represent a Euclidean length.

The object movement manager 485 is configured to, in response to receiving the current movement data 486, perform an object movement operation to produce a object movement data 488, which is a portion of the second 6DOF movement as represented by the current movement data 488 based on the scaling factor data 484.

Returning to FIG. 4A, the second electronic device 402 may include a communication module 306 providing for communication between the second electronic device 402 and another, external device, such as, for example, the first electronic device 400. In addition to providing for the exchange of data between the first electronic device 400 and the second electronic device 402, the communication module 406 may also be configured to emit a ray or beam as described above to communicate an electronic signal. The second electronic device 402 may include a sensing system 404 including an image sensor and an audio sensor, such as is included in, for example, a camera and microphone, an inertial measurement unit including, for example an accelerometer and/or a gyroscope and/or a magnetometer, a touch sensor such as is included in a touch sensitive surface of a handheld electronic device, or smartphone, and other such sensors and/or different combination(s) of sensors. A processor 409 may be in communication with the sensing system 404 and a controller 405 of the second electronic device 402, the controller 405 having access to a memory 408 and controlling overall operation of the second electronic device 402.

As noted above, a controller, such as, for example, the handheld electronic device 102 described above, may be manipulated by a user for interaction and navigation in the virtual environment. When navigating in the virtual environment, the user may direct, or point, the handheld electronic device 102 to a virtual feature to be selected, and a virtual beam may be generated by the system, based on, for example, orientation information generated by the sensors of the handheld electronic device 102, to identify the virtual feature and/or location to be selected by the user. In some implementations, the light source 108 may direct a ray or beam toward a virtual feature or item to be selected, and the ray or beam generated by the light source 108 may be detected by the system (for example, by a camera on the HMD 100) and a rendering of the detected ray or beam may be displayed to the user in the virtual environment for selection of the virtual feature.

Figure 5:
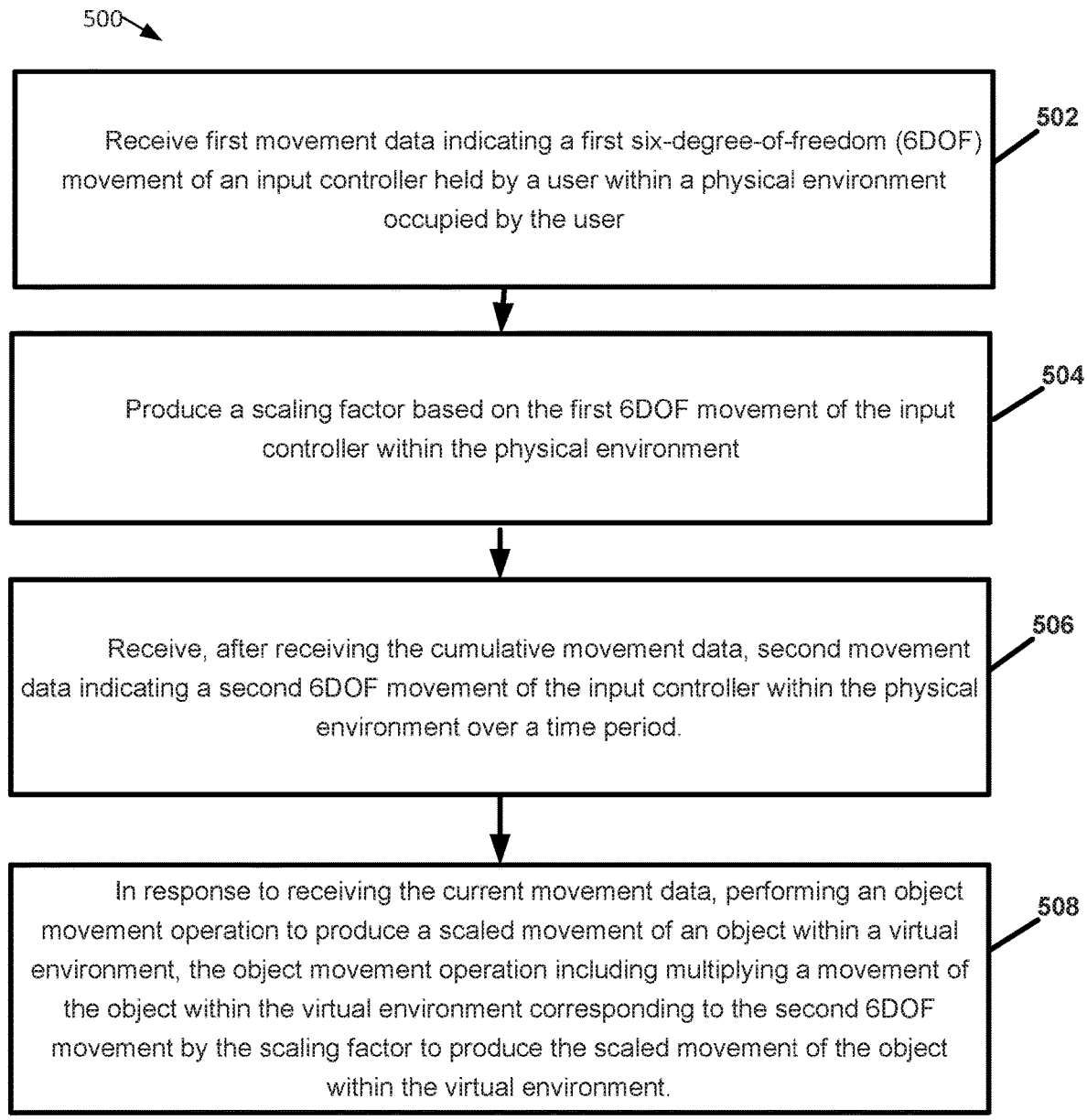
FIG. 5 is a flow chart illustrating operation of a virtual reality system according to an example implementation.

FIG. 5 is a flow chart that illustrates an example method 500. The method 500 may be performed by software constructs described in connection with FIGS. 4A and 4B, which reside in memory 480 of the first electronic device 400 and are run by the processor 490.

At 502, the first electronic device 400 receives previous movement data indicating a first six-degree-of-freedom (6DOF) movement of an input controller held by a user within a physical environment occupied by the user.

At 504, the first electronic device 400 produces a scaling factor based on the first 6DOF movement of the input controller within the physical environment.

At 506, after receiving the cumulative movement data, the first electronic device 400 receives current movement data indicating a second 6DOF movement of the input controller within the physical environment over a time period;

St 508, in response to receiving the current movement data, the first electronic device 400 performs an object movement operation to produce a 6DOF movement of an object within a virtual environment viewed by the user on a display. The 6DOF movement of the object within the virtual environment is a portion of the second 6DOF movement of the input controller based on the scaling factor.

Figure 6A:
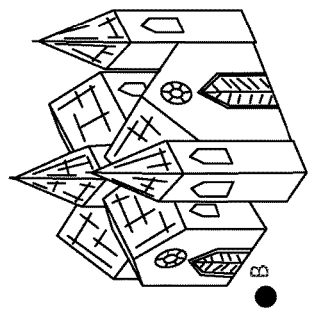
Figure 6A:
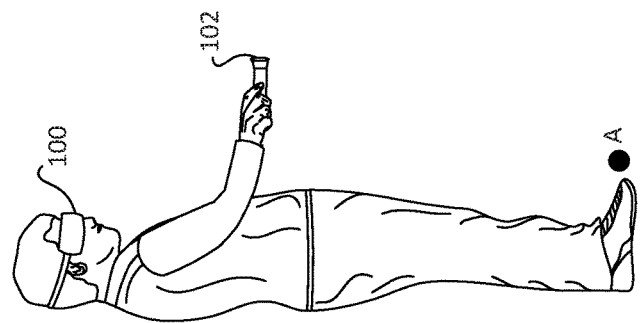
Figure 6B:
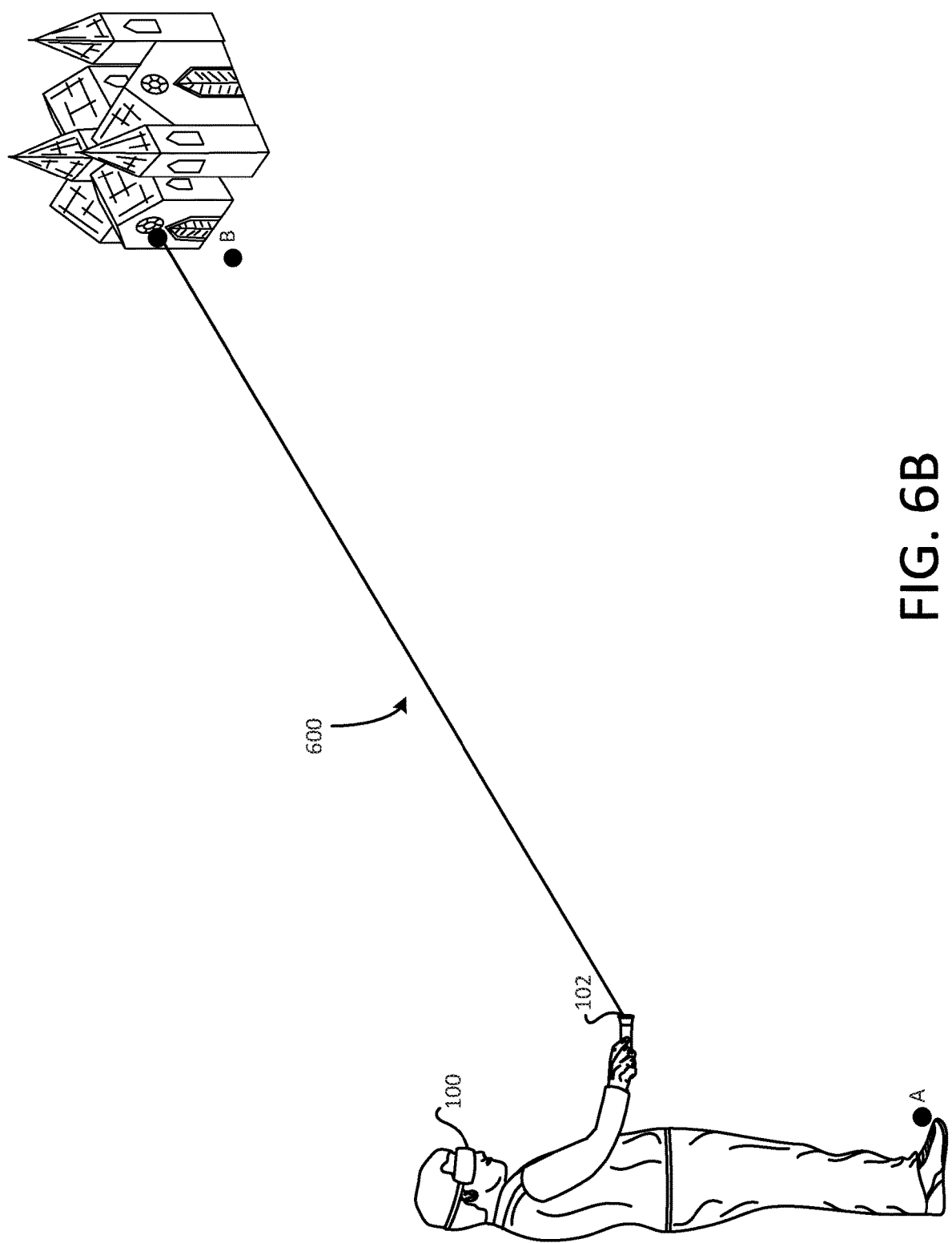

As shown in FIG. 6A, a user in a virtual environment at a position A in the virtual environment (which can be referred to as a virtual position) may choose to move to a position B in the virtual environment (which also can be referred to as a virtual position) by, for example, directing a virtual beam generated by the handheld electronic device 102 as described above toward a virtual feature 650 at the virtual position B, as shown in FIG. 6B. Upon further manipulation of the handheld electronic device 102, for example, release of a button directing the beam to the virtual feature 650 at the virtual position B, the user may be moved, or teleported, or transported, to the virtual position B, as shown in FIG. 6C. In the example shown in FIGS. 6A-6C, the user has not chosen to adjust his scale, or perspective, relative to the virtual features in the virtual environment as described above. Thus, in this example, the user is moved, or teleported, or transported, to the virtual position B at essentially the same scale (relative to the features in the virtual environment) as at the virtual position A.

In some implementations, the movement of the user from the virtual position A to the virtual position B, in response to the input by the user, for example, via the handheld electronic device 102, may be substantially immediate, with the user being at the virtual position A at one moment, and at the virtual position B the next, making the movement from the virtual position A to the virtual position B feel substantially instantaneous to the user. In some implementations, the user may experience a dynamic virtual animation of the movement of the user from the virtual position A to the virtual position B, as if the user were actually traveling through the air and/or over the terrain from the virtual position A to the virtual position B, providing the user with a more connected virtual experience in moving from the virtual position A to the virtual position B.

In some implementations, whether the user's movement from the virtual position A to the virtual position B is substantially immediate, or the user experiences a dynamic virtual animation in moving from the virtual position A to the virtual position B, the user may arrive at the virtual position B and come to a gradual stop, rather than an abrupt stop. This gradual stop (rather than an abrupt arrival, or stop), which may maintain some feeling of the user's momentum when moving from the virtual position A to the virtual position B, may provide the user with a more natural transition into the virtual environment at the virtual position B.

In some situations, the user may wish to increase or decrease his scale relative to the virtual features in the virtual environment, or to scale the size (i.e., increase or decrease) of the virtual features in the virtual environment relative to the user. This virtual scaling of the user's size relative to the virtual environment, or the virtual scaling of the virtual features in the virtual environment relative to the user, may be done when also moving from a first virtual position or location to a second virtual position or location in the virtual environment, allowing the user's perspective, or view, to be scaled or adjusted in accordance with the user's selection. An example implementation of a virtual reality system which allows a user to move (e.g., teleport, transport) from a first virtual location to a second virtual location, and/or to scale a size of the user relative to the virtual features of the virtual environment (or to scale a size of the virtual features in the virtual environment relative to the user), so that the user's perspective, or view, is scaled to the newly selected scaled size, is shown in FIG. 5A.

Figure 6D:
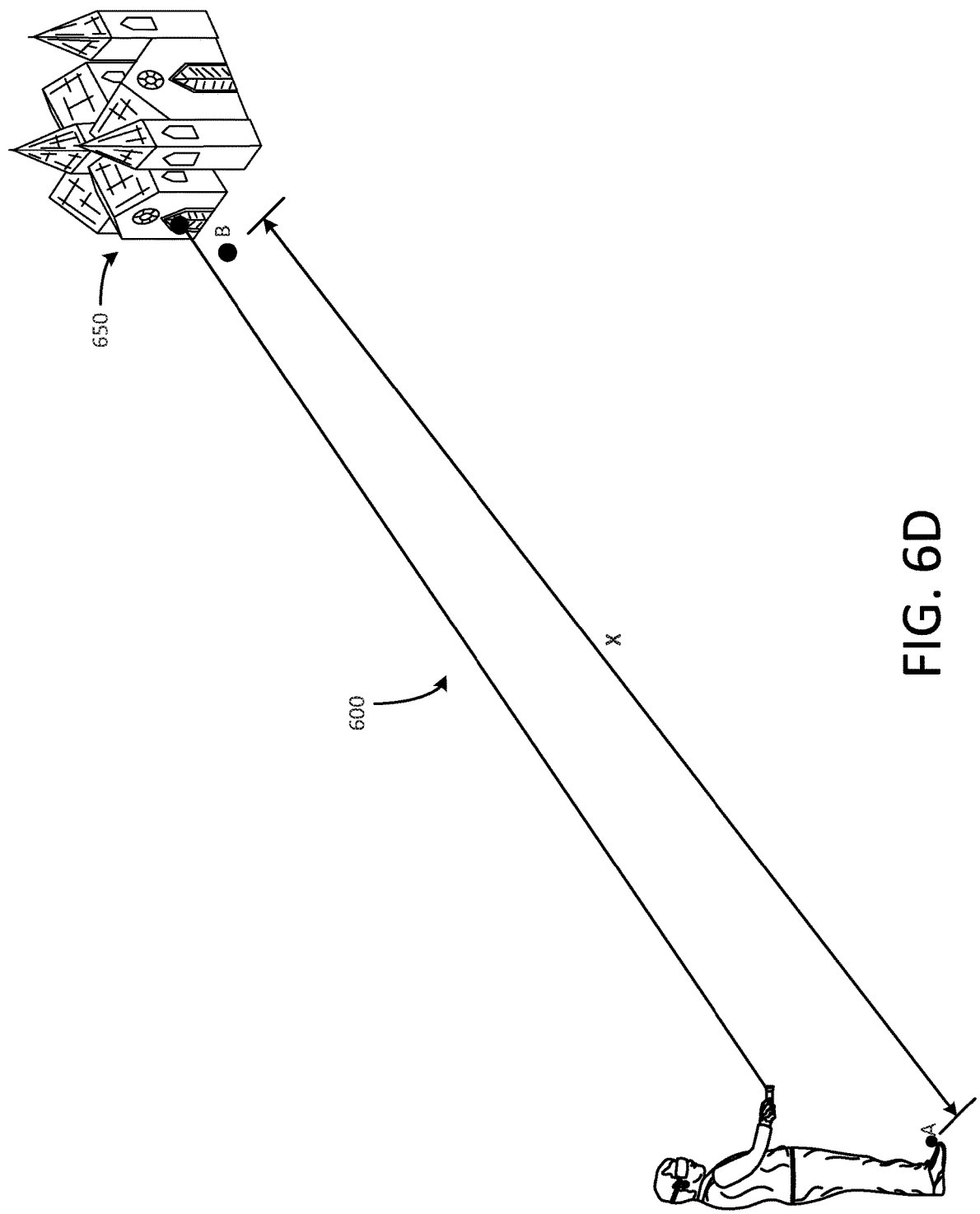

As shown in FIG. 6D, a user positioned at first virtual position A relative to a feature 550 at a second virtual position B may, for example, manipulate the handheld electronic device 102 to indicate the user wishes to move to the feature 650 at the second position B. This manipulation of the handheld electronic device 102 may, for example, cause the device to generate a beam 600 focused on the feature 650 at the second virtual position B, indicating the user wants to move (e.g., teleport, transport) to the second virtual position B, corresponding to the selected feature 650.

Figure 7:
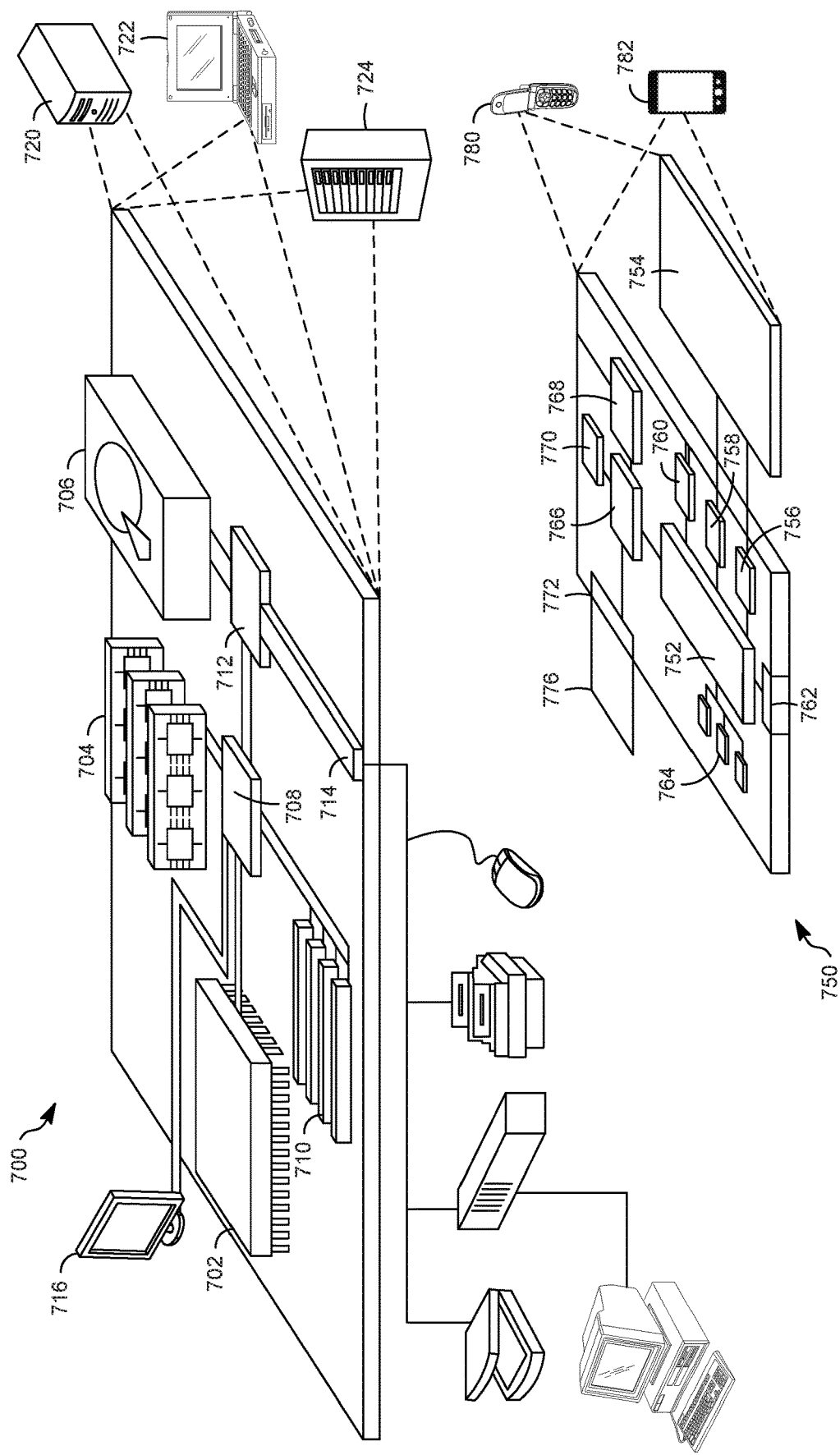
FIG. 7 shows an example of a computer device and a mobile computer device that can be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
receiving, by processing circuitry of a computing system, first movement data indicating a first six-degree-of-freedom (6DOF) movement of an input controller held by a user within a physical environment occupied by the user;
producing, by the processing circuitry, a scaling factor based on the first 6DOF movement of the input controller within the physical environment;
receiving, by the processing circuitry after receiving the first movement data, second movement data indicating a second 6DOF movement of the input controller within the physical environment over a time period;
in response to receiving the second movement data, performing, by the processing circuitry, an object movement operation to produce a scaled movement of an object within a virtual environment, the object movement operation including multiplying a movement of the object within the virtual environment corresponding to the second 6DOF movement by the scaling factor to produce the scaled movement of the object within the virtual environment.

2. The method as in claim 1, wherein the first movement data includes an initial 6DOF position of the input controller within the physical environment; and
wherein receiving the first movement data includes obtaining a change of 6DOF position with respect to the initial 6DOF position.

3. The method as in claim 1, wherein the second movement data includes a 6DOF position of the input controller within the physical environment at a beginning of the time period; and
wherein receiving the second movement data includes obtaining a change of 6DOF position with respect to the 6DOF position of the input controller within the physical environment at the beginning of the time period.

4. The method as in claim 3, wherein receiving the second movement data further includes generating a Euclidean distance between a current three-dimensional position of the input controller within the physical environment and a three-dimensional position of the input controller within the physical environment at the beginning of the time period.

5. The method as in claim 3, wherein receiving the second movement data further includes generating an angular displacement between a current three-dimensional orientation of the input controller within the physical environment and a three-dimensional orientation of the input controller within the physical environment at the beginning of the time period.

6. The method as in claim 1, wherein producing the scaling factor based on the first 6DOF movement of the input controller within the physical environment includes:
in response to the first movement being less than a first threshold, generating a first scaling factor; and
in response to the first movement being greater than the first threshold, generating a second scaling factor, the second scaling factor being greater than the first scaling factor.

7. The method as in claim 6, wherein generating the second scaling factor in response to the first movement being greater than the first threshold includes:
in response to the first movement being less than a second threshold that is greater than the first threshold, generating a third scaling factor, the third scaling factor being between the first scaling factor and the second scaling factor.

8. The method as in claim 7, wherein generating the third scale factor includes producing, as the third scale factor, a number that varies linearly with the first movement.

9. The method as in claim 1, wherein the computing system is a virtual reality (VR) system; and
the first movement data is received by the processing circuitry at a start of a hand gesture performed by the user.

10. The method as in claim 1, wherein the second movement data further includes trigger data indicating whether the user has engaged a trigger of the input controller; and
wherein the object movement operation is performed in response to the trigger data indicating that the user engaged the trigger and is not performed in response to the trigger data indicating that the user did not engage the trigger.

11. A computer program product comprising a nontransitive storage medium, the computer program product including code that, when executed by processing circuitry of a computing system, causes the processing circuitry to perform a method, the method comprising:
receiving first movement data indicating a first six-degree-of-freedom (6DOF) movement of an input controller held by a user within a physical environment occupied by the user;
producing a scaling factor based on the first 6DOF movement of the input controller within the physical environment;
receiving, after receiving the first movement data, second movement data indicating a second 6DOF movement of the input controller within the physical environment over a time period;
in response to receiving the second movement data, performing an object movement operation to produce a scaled movement of an object within a virtual environment, the object movement operation being based on the second 6DOF movement and the scaling factor.

12. The computer program product as in claim 11, wherein performing the object movement operation includes multiplying a movement of the object within the virtual environment corresponding to the second 6DOF movement by the scaling factor to produce the scaled movement of the object within the virtual environment.

13. The computer program product as in claim 11, wherein the first movement data includes an initial 6DOF position of the input controller within the physical environment; and
wherein receiving the first movement data includes obtaining a change of 6DOF position with respect to the initial 6DOF position.

14. The computer program product as in claim 11, wherein the second movement data includes a 6DOF position of the input controller within the physical environment at a beginning of the time period; and
wherein receiving the second movement data includes obtaining a change of 6DOF position with respect to the 6DOF position of the input controller within the physical environment at the beginning of the time period.

15. The computer program product as in claim 14, wherein receiving the second movement data further includes generating a Euclidean distance between a current three-dimensional position of the input controller within the physical environment and a three-dimensional position of the input controller within the physical environment at the beginning of the time period.

16. The computer program product as in claim 14, wherein receiving the second movement data further includes generating an angular displacement between a current three-dimensional orientation of the input controller within the physical environment and a three-dimensional orientation of the input controller within the physical environment at the beginning of the time period.

17. The computer program product as in claim 11, wherein producing the scaling factor based on the first 6DOF movement of the input controller within the physical environment includes:
   in response to the first movement being less than a first threshold, generating a first scaling factor; and
   in response to the first movement being greater than the first threshold, generating a second scaling factor, the second scaling factor being greater than the first scaling factor.

18. The computer program product as in claim 17, wherein generating the second scaling factor in response to the cumulative movement being greater than the first threshold includes:
   in response to the first movement being less than a second threshold that is greater than the first threshold, generating a third scaling factor, the third scaling factor being between the first scaling factor and the second scaling factor.

19. The computer program product as in claim 18, wherein generating the third scale factor includes producing, as the third scale factor, a number that varies linearly with the cumulative movement.

20. A computing system, comprising:
   a network interface;
   memory; and
   a processing including processing circuitry, the processing circuitry being configured to:
      receive first movement data indicating a cumulative six-degree-of-freedom (6DOF) movement of an input controller held by a user within a physical environment occupied by the user;
      produce a scaling factor based on the first 6DOF movement of the input controller within the physical environment;
      receive, after receiving the first movement data, second movement data indicating a second 6DOF movement of the input controller within the physical environment over a time period;
      in response to receiving the second movement data, perform an object movement operation to produce a scaled movement of an object within a virtual environment, the object movement operation being based on the second 6DOF movement and the scaling factor.

* * * * *